United States Patent
Allen et al.

(10) Patent No.: US 6,705,084 B2
(45) Date of Patent: Mar. 16, 2004

(54) CONTROL SYSTEM FOR ELECTRIC ASSISTED TURBOCHARGER

(75) Inventors: John Allen, Torrance, CA (US); Rhett Hedrick, Santa Barbara, CA (US); Len Wedman, Santa Barbara, CA (US); Gerhard Delf, Santa Barbara, CA (US); Daniel Black, Santa Barbara, CA (US); Kevin Birch, Santa Barbara, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/898,355

(22) Filed: Jul. 3, 2001

(65) Prior Publication Data

US 2003/0005695 A1 Jan. 9, 2003

(Under 37 CFR 1.47)

(51) Int. Cl.[7] .................................................. F02B 33/44
(52) U.S. Cl. ....................................................... 60/608
(58) Field of Search .................................. 60/608, 607

(56) References Cited

U.S. PATENT DOCUMENTS

| | | | | |
|---|---|---|---|---|
| 4,745,755 A | * | 5/1988 | Kawamura | 60/608 |
| 4,774,811 A | * | 10/1988 | Kawamura | 60/608 |
| 4,833,887 A | * | 5/1989 | Kawamura et al. | 60/608 |
| 4,850,193 A | * | 7/1989 | Kawamura | 60/608 |
| 4,884,406 A | | 12/1989 | Kawamura | |
| 4,981,017 A | * | 1/1991 | Hara et al. | 60/608 |
| 5,088,286 A | * | 2/1992 | Muraji | 60/608 |
| 5,605,045 A | | 2/1997 | Halimi et al. | |
| 5,678,407 A | * | 10/1997 | Hara | 60/608 |
| 5,904,471 A | | 5/1999 | Woollenweber et al. | |

* cited by examiner

Primary Examiner—Thomas Denion
Assistant Examiner—Thai-Ba Trieu
(74) Attorney, Agent, or Firm—Ephraim Starr

(57) ABSTRACT

System for controlling an electric assisted turbocharger comprise an electric motor disposed within turbocharger, and an electric motor controller electrically coupled thereto for purposes of controlling the same. A memory is electrically coupled to the electric motor controller and is configured with a condition map that correlates electric motor instructions with engine and turbocharger conditions. The system includes sensors that are electrically coupled to the electric motor controller, and that are configured to sense conditions of at least one of the turbocharger and the internal combustion engine that is coupled thereto. The electric motor controller is configured to control the electric motor based upon the input received from the plurality of sensors as compared to the data contained multi-dimensional condition map. The system provides electric motor speed control, boost pressure control dampening, and can be used to produce electricity from the electric motor depending on the particular operating condition.

17 Claims, 3 Drawing Sheets

CONTROL SYSTEM FOR ELECTRIC ASSISTED TURBOCHARGER

FIELD OF THE INVENTION

This invention relates generally to the field of turbochargers and, more particularly, to a system for controlling electric assisted turbochargers.

BACKGROUND OF THE INVENTION

Turbochargers for gasoline and diesel internal combustion engines are devices known in the art that are used for pressurizing or boosting an intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine to spin within the housing. The exhaust gas-driven turbine is mounted onto one end of a shaft that is common to a radial air compressor mounted onto an opposite end of that shaft. Thus, rotary action of the turbine also causes the air compressor to spin within a compressor housing of the turbocharger that is separate from the exhaust housing. The spinning action of the air compressor causes intake air to enter the compressor housing and be pressurized or boosted a desired amount before it is mixed with fuel and combusted within the engine combustion chamber.

Because the rotary action of the turbine is dependent upon the heat and volumetric flow of exhaust gas exiting the engine, turbochargers are often of reduced effectiveness when the engine to which they are coupled is run at a low speed. The reduced effectiveness is often labeled turbo-lag. In order to overcome turbo-lag when the heat and volumetric flow of exhaust gas is low, an electric motor is known for rotating the shaft and inducing the compressor to spin.

Without proper timing and power provision to the electric motor, the electric motor can hinder rather than enhance the performance of the turbocharger. It is, therefore, desirable to provide intelligent operation control to the electric motor in order to both maximize engine performance, and to provide a responsible electric power management system. It is desired that such intelligent operation control system be configured to prevent powering the electric motor of the electric assisted turbocharger during engine operating conditions not calling for turbocharger assistance.

Additionally, engine designers constantly seek improvements for controlling boost pressure on an engine. In an effort to more rapidly and more precisely control boost pressure, in a conventional turbocharger, designers have replaced pneumatic actuators with electronic controlled actuators for moving wastegate valves and variable geometry blades. The electronic actuators receive their instructions from the engine electronic control unit (ECU) and various engine sensors. This results in a reduction in time to reach a target boost pressure, and smaller over-boost and under-boost error margins.

It is, therefore, also desirable that an intelligent operation control system for use with an electric assisted turbocharger be configured to reduce the time needed to reach a target boost pressure, and to reduce over-boost and under-boost error margins, thereby enabling an improved degree of turbocharger efficiency.

SUMMARY OF THE INVENTION

A system for controlling an electric assisted turbocharger, constructed according to principles of this invention, employ an electric motor that is disposed within a turbocharger, an electric motor controller is electrically coupled to the electric motor for purposes of controlling the same, and a memory means is electrically coupled to the electric motor controller. The memory means is configured having a condition map that correlates electric motor instructions with engine and turbocharger conditions. The system includes a number of sensors that are electrically coupled to the electric motor controller. The sensors are configured to sense conditions of at least one of the turbocharger and the internal combustion engine that is coupled thereto.

The electric motor controller is configured to control the electric motor based upon the input received from the plurality of sensors as compared to the data contained in the multi-dimensional condition map. In an example invention embodiment, the motor controller is configured to operate the electric motor of the electric assisted turbocharger in a manner best suited to provide the desired engine performance. For example, the system may comprise a clutch engagement sensor, that senses whether a clutch is engaged, and or a brake engagement sensor, that senses whether a brake is engaged, and the electric motor controller is configured to remove power to the electric motor when the clutch engagement sensor and/or the brake sensor indicates that the clutch is not engaged or the brake is activated.

In another invention embodiment, the system comprises a boost pressure sensor that senses the boost pressure in the turbocharger and that is configured to achieve a target boost pressure, and to reduce over-boost and under-boost error margins. In such embodiment, the electric motor controller is configured to select a target boost pressure based upon application of the sensed conditions of at least one of the turbocharger and the internal combustion engine to the condition map in the memory. The system is configured to supply increased power to the electric motor when the boost pressure sensed by the boost pressure sensor is lower than the selected target boost pressure, and to supply decreased power to the electric motor when the boost pressure sensed by the boost pressure sensor is higher than the selected target boost pressure. Additionally, the system can be configured to operate in a generator mode, whereby the electrical motor is operated to produce electricity based on the spinning of the turbine by the exhaust gas.

BRIEF DESCRIPTION OF THE DRAWINGS

The aspects of the present invention are more readily understood when considered in conjunction with the accompanying drawings and the following detailed description wherein.

DETAILED DESCRIPTION OF THE INVENTION

Control systems for electrically assisted turbochargers, constructed according to principles of this invention, comprise a control means that is electrically coupled to an electric motor of the turbocharger, and that is connected with a plurality of sensors configured to monitor a number of different engine and/or turbocharger operating parameters. A memory means is coupled to the control means and has stored in it a condition map comprising information relating to predetermined operating conditions of the engine and/or turbocharger. The system monitors the sensed operating conditions, and operates the electric motor in the turbocharger according to certain predetermined operating instructions provided by the condition map, in a manner best addressing the particular engine operating requirements.

Figure 1:
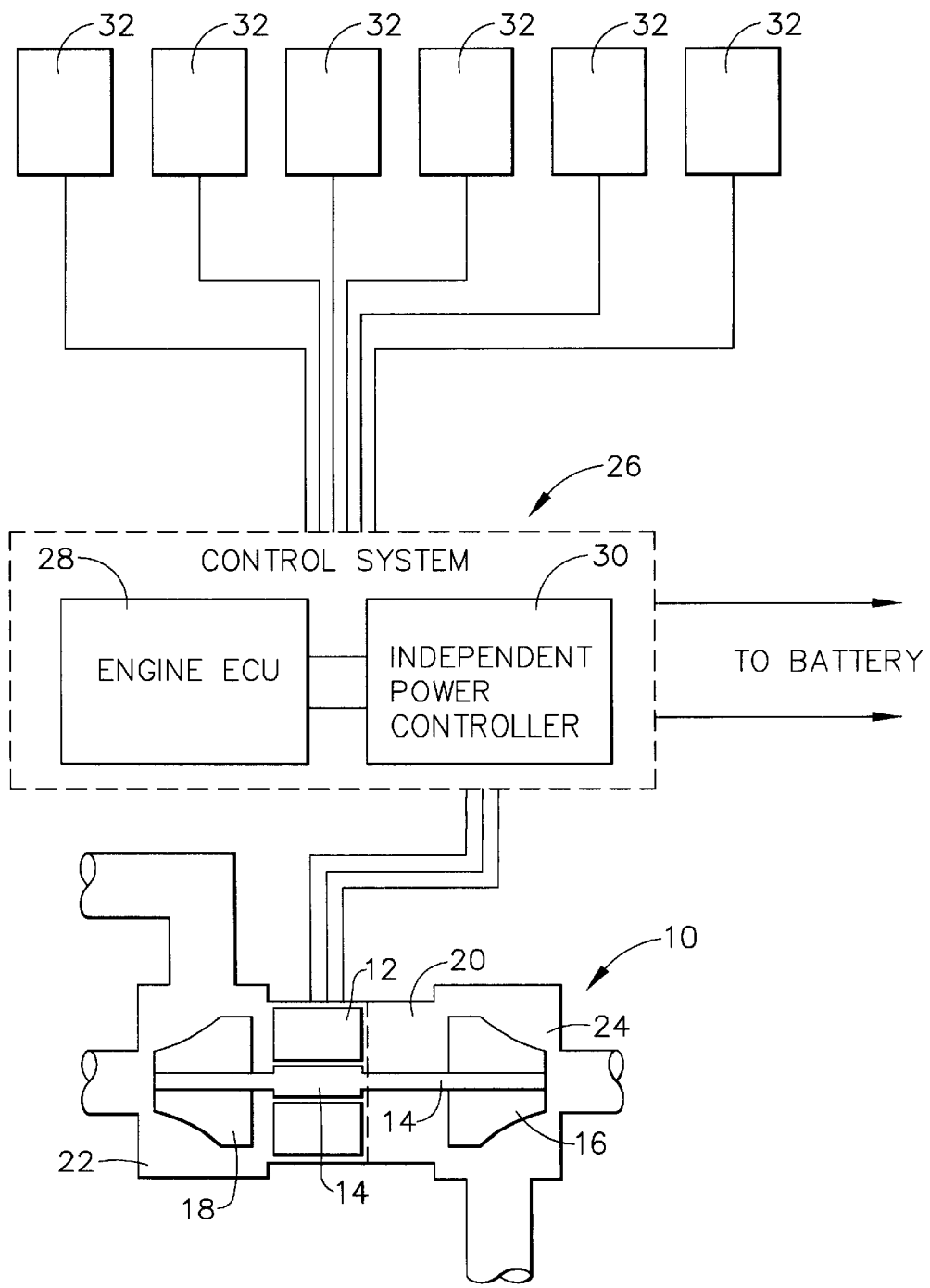
FIG. 1 is a schematic diagram illustrating an electric assisted turbocharger control system, constructed according to principles of this invention.

As shown in FIG. 1, an electrically assisted turbocharger 10 generally comprises an electric motor 12 that is disposed around a turbocharger shaft 14 interconnects the turbine 16 and the compressor 18. The Electric motor 12 is disposed within the turbocharger adjacent the center housing 20, and is interposed axially between the center housing 20 and a compressor housing 22 that houses the compressor 18. The turbine 16 is disposed within a turbine housing 24.

An electric motor control system/controller 26 for controlling the electric assisted turbocharger is electrically coupled to the electric motor 12. In an example embodiment, the control system comprises an engine Electronic Control Unit (ECU) 28 and an independent power controller 30. The engine ECU is electrically coupled to the independent power controller 30. The system also comprises multiple sensors 32 that are electrically coupled to at least one of the engine ECU 28 and the independent power controller 30. The independent power controller 30 is electrically coupled to the electric motor 12 of the turbocharger 10. The electric motor 12 is disposed around the turbocharger shaft 14 and is configured to apply a torque to the shaft, and attached compressor 18, in either direction of rotation.

A memory and a microprocessor is connected with, or can be part of, at least one of the engine ECU 28 and the power controller 30. The memory is electrically coupled to the microprocessor, and is programmed having a plurality of condition maps for different turbocharger control schemes. The condition maps are configured to correlate a desired action of the electric motor 12 with determinable engine and turbocharger characteristics. The microprocessor uses engine signals and sensor inputs in conjunction with the condition map data stored in the memory to control the electric motor 12 of the electric assisted turbocharger 10. The independent power controller 30 is used to control the flow of power to the electric motor 12. In an embodiment of the present invention, the independent power controller functions to convert power to the electric motor from direct current (DC), e.g., supplied by an on-board vehicle battery, to alternating current (AC) used to power the electric motor. In some operating instances, the electric motor 12 of the electric assisted turbocharger 10 can be operated to act as a generator to draw power from the spinning of the turbine 16 caused by the exhaust gas pressure. When the electric motor 12 is operated to perform in the function of a generator, the independent power controller functions to convert the power provided from the electric motor from AC to DC. This generated DC power can be used to power desired electric features of the vehicle, or simply be used to maintain the charge of the on-board battery. The independent power controller is also configured to perform power conditioning and is capable of intelligent speed control.

The control system of this invention is configured to control operation of the electric motor according to the following control scheme. Depending on the current operating conditions of the engine and the performance demanded by the driver, the system is configured to operate in one of the three following modes: (1) a motor mode; (2) a generator mode; or (3) a neutral mode. In the motor mode, the electric motor is operated by the controller to spin the shaft 14 of the turbocharger to increase the boost of intake air to the engine. In a neutral mode, the turbocharger operates on the temperature and volume of exhaust gas of the engine without any assistance from the electric motor. In a generator mode, the electric motor is operated to produce electricity based on the spinning of the turbine 16 by the exhaust gas of the engine.

The magnitude of power that is supplied to, or generated from, the electric motor can vary depending on the particular engine and/or turbocharger operating condition, and is determined by the difference between current operating conditions (as monitored by one or more of the sensors) and driver demanded performance as programmed into the condition maps. Thus, if a driver is demanding that the engine provide maximum thrust, then the system will operate to activate the electric motor to enhance the boost provided by the compressor rather than as a generator to generate electricity. The system has the flexibility to accommodate different control algorithms for different applications. In an embodiment of the present invention, a control algorithm is designed for maximum boost from the turbocharger at the expense of some power generation by the electric motor. In an additional embodiment of the present invention, a control algorithm is designed for generating the maximum amount of electricity possible from the electric motor of the turbocharger at the expense of some boost. The function that the engine ECU and the power controller play in performing control tasks varies from one application to another.

The sensors 32 are configured to monitor at least one of the following exemplary engine and turbocharger conditions: intake air flow; engine revolutions per minute (RPMs); engine load; boost pressure and temperature; intake manifold pressure and temperature; accelerator position; accelerator change rate; fueling rate; engine temperature; engine timing; battery voltage; electric motor current flow; ambient temperature and pressure; brake pressure; clutch pressure; oil pressure; turbocharger speed; and a temperature of the electric motor winding in the turbocharger.

In an embodiment of the present invention, the system is configured to prevent an undesired powering of the electric motor in the turbocharger when not necessary. One situation in which the electric motor powering of the turbocharger is not necessary is when a driver "revs" the engine at a stop light. Although the driver is pressing down on the accelerator, the driver does not need the turbocharger to be activated. An additional situation where power of the electric motor in the turbocharger is not necessary is when the driver of a stick shift vehicle changes gears, i.e., when the clutch is being depressed.

In order to prevent activation of the electric motor of the turbocharger when a driver is revving an engine at a stop light, and when a driver is switching manual transmission gears, a first sensor is provided for sensing whether the clutch is engaged. A second sensor is provided for sensing whether the brakes are engaged.

In an embodiment where the control algorithm is configured for normal driving, current flow to the electric motor will be prevented when the first sensor senses that the clutch is not engaged, indicating that the driver is shifting gears. Likewise, current flow to the electric motor will be prevented when the second sensor senses that the brakes are engaged, indicating that the driver is revving the engine at a stop light. In alternative embodiments, the controller may be configured to operate differently depending on the particular control algorithm being utilized by the microprocessor.

In an additional embodiment of the present invention, the above described system is used to improve boost pressure control of an electric assisted turbocharger. In a conventional variable geometry turbocharger, when an engine's ECU determines that the turbocharger should spin up to a target boost pressure, the ECU signals the nozzle vanes of the variable geometry turbocharger to close. The vanes are controlled by the engine ECU to remain closed until the target boost pressure is achieved. Once the target boost pressure is achieved, the vanes are signaled to open. Once the vanes open, the system undergoes a cycle of undershooting and overshooting the target boost pressure until an acceptable margin of error exists between the actual boost pressure and the target boost pressure.

The same cycle of events occurs in conventional turbochargers equipped with a wastegate. When an engine's ECU determines that the turbocharger should spin up to a target boost pressure, the ECU signals the wastegate actuator to close the wastegate, and keep the wastegate closed until the target boost pressure is met. Once boost pressure is met, then the wastegate is signaled to open and the system undergoes a cycle of undershooting and overshooting the target boost pressure until an acceptable margin of error exists between the actual boost pressure and the target boost pressure.

Figure 2:
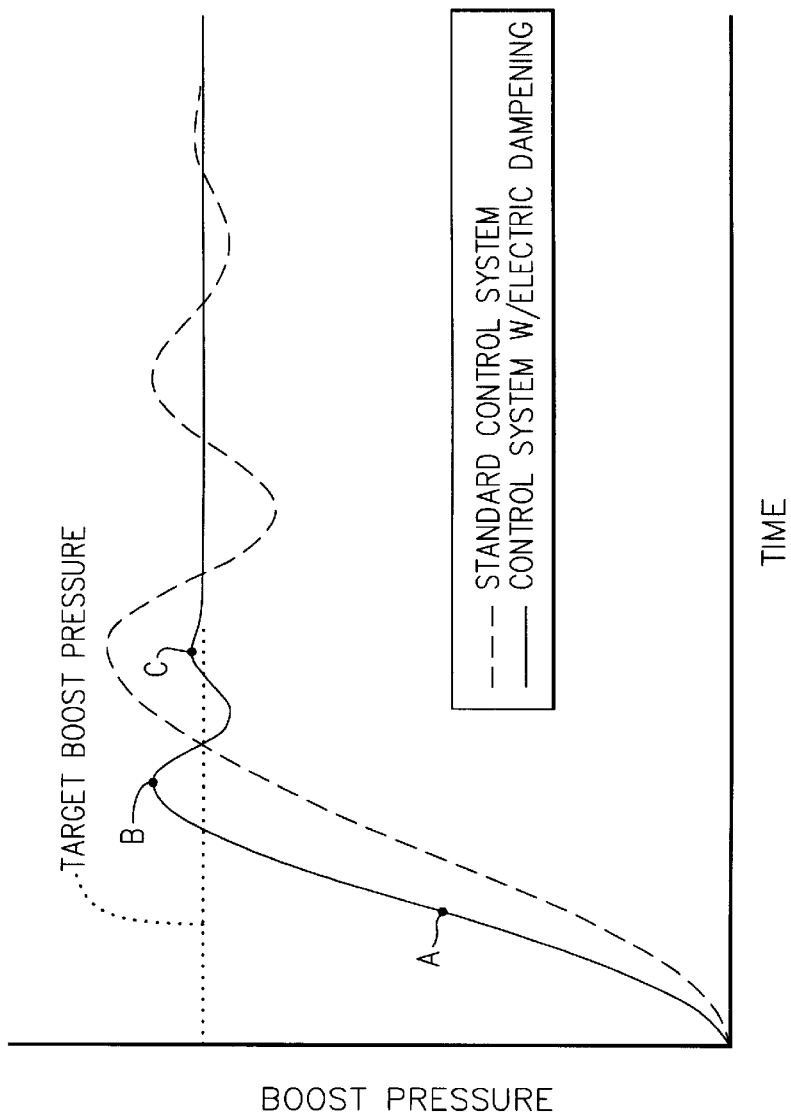
FIG. 2 is a graph of boost pressure (y-axis) as a function of time (x-axis) illustrating the impact of using electric dampening, according to principles of this invention, to improve boost pressure control.
Figure 3:
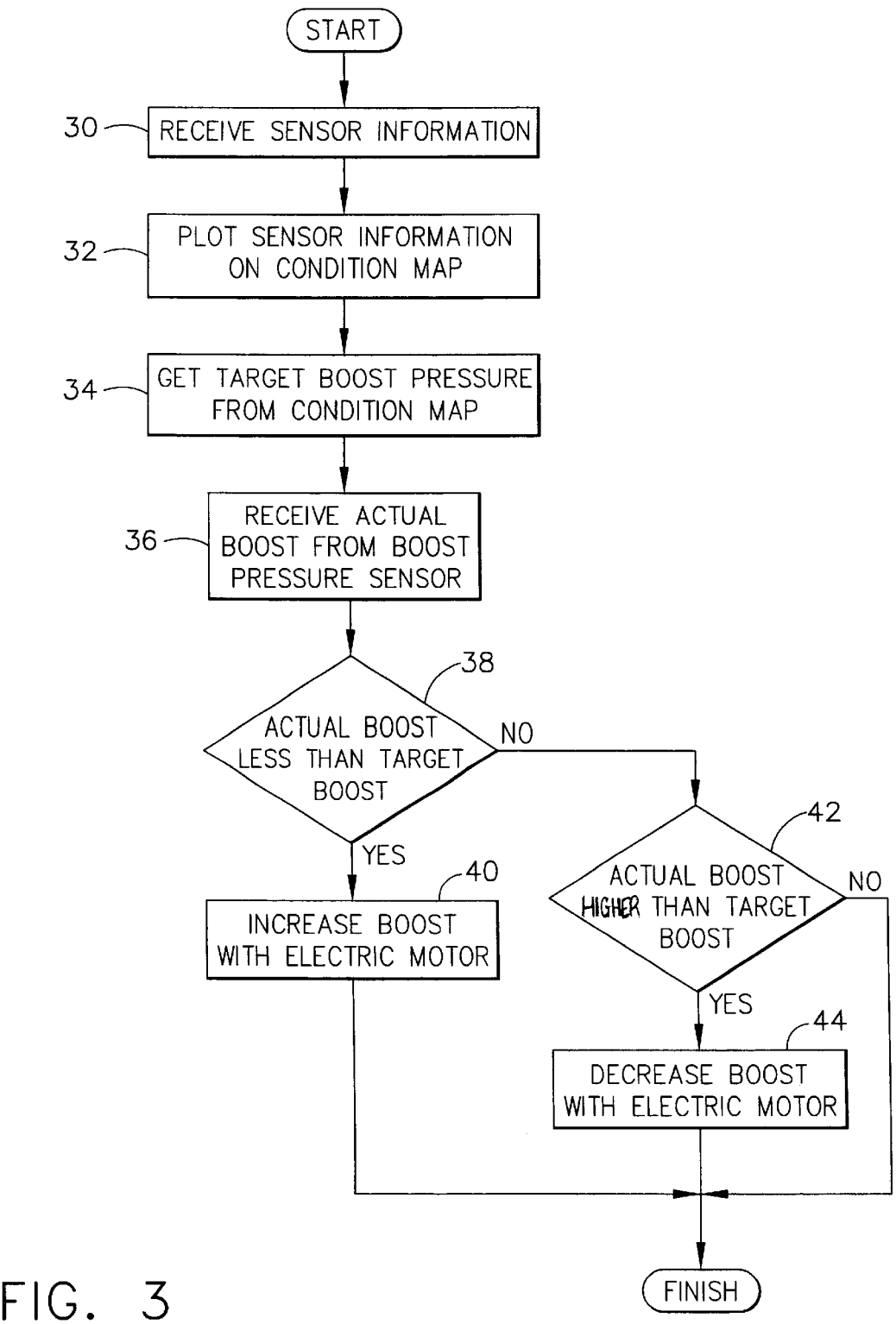
FIG. 3 is a flow diagram illustrating of system for providing boost pressure control according to an embodiment of the present invention.

In addition to the variable geometry vane and wastegate systems described above, control systems of this invention can be used with an electric assisted turbocharger to control the electric motor in a manner that dampens the cycle of undershooting and overshooting described above. FIG. 2 graphically illustrates the positive dampening impact that electric motor control can have, when controlled according to principles of this invention, in reducing the amount of time necessary to achieve a relatively constant/steady target boost pressure when compared to that of a conventional turbocharger as described above. Electrically damped systems of this invention can react to the same operating conditions in a shorter time and with a reduced margin of error. FIG. 3 illustrates a control scheme, according to principles of this invention, for controlling the boost pressure provided by an electric assisted turbocharger. A condition map, stored in the memory, contains target boost pressures under pre-specified sets of engine and turbocharger parameters. The microprocessor located in at least one of the engine ECU and the independent power controller receives engine and turbocharger parameters from a plurality of sensors and from the engine ECU, Box 30. The microprocessor plots the engine and turbocharger parameters onto the stored condition map, Box 32. The plot of engine and turbocharger parameters, yields a target boost pressure, Box 34.

The microprocessor receives the actual boost pressure from a boost pressure sensor, Box 36. The microprocessor determines whether the actual boost pressure is higher than the target boost pressure, Box 38. If the actual boost pressure is less than the target boost pressure, the microprocessor uses the electric motor of the electric assist turbocharger to increase the actual boost pressure, Box 40. Alternatively, if the actual boost pressure is not less than the target boost pressure, then the microprocessor determines whether the actual boost pressure is higher than the target boost pressure, Box, 42. If the actual boost pressure is higher than the target boost pressure, then the microprocessor uses the electric motor of the electric assist turbocharger to lower the actual boost pressure, Box 44.

The electric motor places a torque in the direction of turbocharger shaft rotation when the actual boost pressure is below target boost pressure. Point "A" in FIG. 2 represents a condition where the actual measured boost pressure is below a target boost pressure. In this operating condition, the independent power controller would operate the electric motor to place a torque on the turbocharger shaft in the direction of turbocharger shaft rotation, thereby causing the boost pressure to increase more rapidly toward the target boost pressure.

Likewise, when the actual boost pressure is above the target boost pressure, the electric motor applies torque opposite to the turbocharger shaft rotation. Point "B" in FIG. 2 represents an operating condition where the actual measured boost pressure is above a desired target pressure. In this operating condition, the independent power controller reverses the power to the electric motor to induce a torque opposite to the direction of turbocharger shaft rotation. This causes the boost pressure to decrease toward the target boost pressure.

The magnitude of the applied torque increases as distance from target boost pressure increases. Thus, the magnitude of the applied torque is higher at point B than at point C, because at point B, the actual boost pressure is farther from the target boost pressure, then at point C.

In an additional embodiment of the present invention, the electronic damping of the boost pressure cycle, involves anticipating the overboost associated with bringing a turbocharger up to a target boost pressure. Systems that anticipate overboost, may for example be configured to open wastegate valves or variable geometry blades once a given percentage of the target boost is reached, for example 90%. Alternatively, a system anticipating overboost, may calculate the rate of boost pressure change and use the boost change rate in conjunction with the difference between the target and actual boost pressure to begin opening valves and blades. In such cases, the electronic damping system could adapt to the anticipation methods being used and still provide damping during over-boosting and under-boosting.

Having now described the invention in detail as required by the patent statutes, those skilled in the art will recognize modifications and substitutions to the specific embodiments disclosed herein. Such modifications are within the scope and intent of the present invention.

What is claimed is:

1. A system for controlling an electric assist turbocharger coupled to an internal combustion engine comprising:
   an electric motor;
   an electric motor controller for controlling the operation of the electric motor;
   a memory electrically coupled to the electric motor controller, the memory having a condition map, the condition map multi-dimensionally correlating electric motor instructions with engine and turbocharger conditions;
   a plurality of sensors electrically coupled to the electric motor controller, the sensors sensing conditions of at least one of the turbocharger, the internal combustion engine, and a component coupled to the internal combustion engine;
   wherein the electric motor controller is configured to control the electric motor based upon signals from the plurality of sensors plotted on the multi-dimensional conditions map and to electrically dampen turbocharger operation about a target boost pressure.

2. The system for controlling an electric assist turbocharger coupled to an internal combustion engine as defined in claim 1 wherein:

one of the plurality of sensors comprises:
: a clutch arrangement sensor that senses whether a clutch is engaged;
: wherein the electric motor controller is configured to remove power to the electric motor when the clutch engagement sensor indicates that the clutch is not engaged.

3. The system for controlling an electric assist turbocharger coupled to an internal combustion engine as defined in claim 1 wherein:
: one of the plurality of sensors comprises:
: a brake engagement sensor that senses whether a brake is engaged;
: wherein the electric motor controller is configured to remove power to the electric motor when the brake engagement sensor indicated that the brake is not engaged.

4. The system for controlling an electric assist turbocharger coupled to an internal combustion engine as defined in claim 1 wherein:
: one of the plurality of sensors comprises:
: a boost pressure sensor that senses the boost pressure in the turbocharger;
: wherein the electric motor controller is configured to select a target boost pressure based upon application of the sensed conditions of at least one of the turbocharger and the internal combustion engine to the condition map in the memory;
: to supply increased power to the electric motor when the boost pressure sensed by the boost pressure sensor is lower than the selected target boost pressure; and
: to supply decreased power to the electric motor when the boost pressure sensed by the boost pressure sensor is higher than the selected target boost pressure.

5. The system for controlling an electric assist turbocharger coupled to an internal combustion engine as defined in claim 1 wherein:
: the electric motor controller for controlling the operation of the electric motor operates the electric motor as a generator if boost pressure overshoots the target boost pressure plus an acceptable margin of error.

6. The system for controlling an electric assist turbocharger coupled to an internal combustion engine as defined in claim 5 wherein:
: the electric assist turbocharger comprises at least one of a variable geometry vane and a wastegate.

7. The system for controlling an electric assist turbocharger coupled to an internal combustion engine as defined in claim 5 wherein:
: the electric motor controller for controlling the operation of the electric motor powers the electric motor if boost pressure undershoots the target boost pressure plus an acceptable margin of error.

8. The system for controlling an electric assist turbocharger coupled to an internal combustion engine as defined in claim 1 wherein:
: the electric assist turbocharger comprises at least one of a variable geometry vane and a wastegate.

9. The system for controlling an electric assist turbocharger coupled to an internal combustion engine as defined in claim 1 wherein:
: the electric motor controller for controlling the operation of the electric motor reverses power to the electric motor to decrease boost pressure toward the target boost pressure.

10. The system for controlling an electric assist turbocharger coupled to an internal combustion engine as defined in claim 9 wherein:
: the reversing of power to the electric motor induces a torque proportional to a difference between a measured boost pressure and the target boost pressure.

11. The system for controlling an electric assist turbocharger coupled to an internal combustion engine as defined in claim 1 wherein:
: the electric motor controller for controlling the operation of the electric motor dampens oscillations about the target boost pressure using one or more anticipation method.

12. The system for controlling an electric assist turbocharger coupled to an internal combustion engine as defined in claim 11 wherein:
: the electric assist turbocharger comprises at least one of a variable geometry vane and a wastegate.

13. The system for controlling an electric assist turbocharger coupled to an internal combustion engine as defined in claim 1 wherein:
: the electric motor controller for controlling the operation of the electric motor anticipates overboost associated with bringing the turbocharger to the target boost pressure.

14. A method for controlling an electric assist turbocharger coupled to an internal combustion engine comprising:
: comparing a boost pressure to a target boost pressure;
: responsive to the comparing, anticipating a boost pressure overshoot if the boost pressure is less than the target boost pressure; and
: outputting a control signal to the electric assist turbocharger that dampens the overshoot.

15. A computer-readable medium storing computer-executable instructions to instruct a controller for controlling an electric assist turbocharger coupled to an internal combustion engine to compare a boost pressure to a target boost pressure; responsive to the comparing, to anticipate a boost pressure overshoot if the boost pressure is less than the target boost pressure; and to output a control signal to the electric assist turbocharger that dampens the overshoot.

16. A method for controlling an electric assist turbocharger coupled to an internal combustion engine comprising:
: comparing a boost pressure to a target boost pressure;
: responsive to the comparing, anticipating a boost pressure undershoot if the boost pressure is greater than the target boost pressure; and
: outputting a control signal to the electric assist turbocharger that dampens the undershoot.

17. A computer-readable medium storing computer-executable instructions to instruct a controller for controlling an electric assist turbocharger coupled to an internal combustion engine to compare a boost pressure to a target boost pressure; responsive to the comparing, to anticipate a boost pressure undershoot if the boost pressure is greater than the target boost pressure; and to output a control signal to the electric assist turbocharger that dampens the undershoot.

* * * * *